F. G. HOUGH.
LICENSE PLATE ATTACHMENT.
APPLICATION FILED DEC. 26, 1919.

1,360,405. Patented Nov. 30, 1920.

Inventor:
Frank G. Hough
By Jones Rain & Hinkle
Attys.

UNITED STATES PATENT OFFICE.

FRANK G. HOUGH, OF CHICAGO, ILLINOIS.

LICENSE-PLATE ATTACHMENT.

1,360,405. Specification of Letters Patent. Patented Nov. 30, 1920.

Application filed December 26, 1919. Serial No. 347,560.

*To all whom it may concern:*

Be it known that I, FRANK G. HOUGH, a citizen of the United States, residing at Chicago, in the county of Cook and State of Illinois, have invented certain new and useful Improvements in License-Plate Attachments, of which the following is a specification.

This invention relates to improvements in license plates and attachments therefor.

One of the objects of the invention is to provide an attachment for a license plate used on automobiles for designating the license number issued by the respective State authorities authorizing the use of the vehicle, upon the public highways, for a designated period, usually for one year. These plates are changed periodically at the expiration of the license bearing the date of the plate and a new plate substituted therefor, bears other indicia, differing from the old one in that the designating number and numerals, indicative of the current year, are different. These plates are issued without any indication as to the local habitat, or residence of the owner.

The object of the invention is to provide a separable plate bearing upon its face the name of the city, town or village from which the owner hails. The auxiliary plate may bear upon its face the name of the owner with his title such, for example, as "Dr. Smith," or an indication of his business as "Smith's Cash Grocery," or the like.

In the drawing:—

In both views the same reference characters indicate similar parts.

Figure 1:
Figure 1 is a front elevation of a license plate with an attached auxiliary plate.
Figure 2:
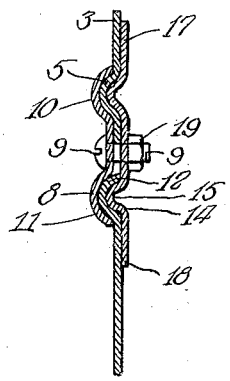
Fig. 2 is a transverse section on line 2—2 of Fig. 1.

The plate 3 is a fair example of the character of license plates issued by authorities of the several States. They are of uniform size because of the fact that the places of attachment of the various automobiles are uniform. Each plate 3 has provided in each of its corners an orifice 4. These openings are made to receive supporting screws or bolts. The plate is provided with a marginal bead 5 near its edges.

I take advantage of the bead for attaching the auxiliary individual plate 6 having thereon an individual designation such as "Chicago." The plate 6 also has a bead 7 bounding its edges. I utilize the bead 7 as a means contributing to hold the plates together. A clip for holding the plate 6 attached to the plate 3 consists of a member 8 perforated near its longitudinal center for the screw 9. The member 8 has a curved portion overlying the bead 5 and a curved portion 11 overlying the bead 12 of the plate 6. A member 14 has a curved part 15 that lies within the bead 12 on the back of the plate 6. This member is also perforated for the clamping screw 9 and has a curved part 16 that lies within the bead 5 of the plate 3. The member 14 also has extended ends 17 and 18 to hold the plates 3 and 6 in vertical alinement.

The clamping screw 9 passes through the clamp members 8 and 14 into the nut 19 and when the screw is passed well through the nut the members are drawn together into clamping contact with each of the plates.

The plate 6 may be removed from plate 3 by loosening the screw to separate the clamping members and thus the plate 6 may quickly be shifted from one license plate to another. The manner of attaching the plates is such that the relative length of the plates is a matter of indifference as the plate 6 may be shifted to any suitable position on plate 3.

Having described my invention, what I claim is:—

In combination with two plates to be joined together at adjacent edges, each plate having near its edge a U-shaped bead, said beads facing alike; a clamp member having two spaced apart beads in shape corresponding with the beads of the plates, to space them apart, separated by an intermediate flat part, said clamp member having terminal flat ends, in the same longitudinal plane with the intermediate flat part, extending beyond the beads; another clamp member, having bent parts in shape corresponding with the beads to overlie said beads and having its ends terminating at the beads and a screw passing through the clamp members and between the beads to hold the parts together.

In testimony whereof I hereunto subscribe my name.

FRANK G. HOUGH.